United States Patent
Young et al.

(10) Patent No.: US 6,811,592 B2
(45) Date of Patent: Nov. 2, 2004

(54) THIN FILM IN-LINE DEGASSER

(75) Inventors: Kent A. Young, Jacksonville, FL (US); Stephen C. Pegram, Fruit Cove, FL (US); Kerry T. Sanders, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/374,467

(22) Filed: Feb. 26, 2003

(65) Prior Publication Data

US 2003/0221557 A1 Dec. 4, 2003

Related U.S. Application Data

(60) Provisional application No. 60/360,910, filed on Mar. 1, 2002.

(51) Int. Cl.[7] .............................................. B01D 19/00
(52) U.S. Cl. ........................ 95/248; 95/262; 96/215; 96/198
(58) Field of Search ................... 96/215, 198, 199, 96/197, 220; 95/262, 248, 249, 247, 266; 261/DIG. 72

(56) References Cited

U.S. PATENT DOCUMENTS

| | | | | |
|---|---|---|---|---|
| 1,452,253 A | * | 4/1923 | Nevitt | ............ 96/207 |
| 1,598,787 A | | 9/1926 | Shields et al. | |
| 2,020,250 A | | 11/1935 | Stephens et al. | |
| 2,064,650 A | | 12/1936 | Emanueli | |
| 2,197,539 A | * | 4/1940 | Hickman | ............ 96/215 |
| 3,368,330 A | | 2/1968 | Elliott et al. | |
| 3,517,487 A | | 6/1970 | Burnham | |
| 3,555,819 A | | 1/1971 | Burnham | |
| 3,789,579 A | | 2/1974 | El-Hindi | |
| 4,007,022 A | * | 2/1977 | Schleicher et al. | ........... 95/243 |
| 4,210,176 A | | 7/1980 | Emming | |
| 4,294,812 A | | 10/1981 | Oler | |
| 4,338,100 A | * | 7/1982 | Wersosky et al. | ............. 95/243 |
| 4,392,874 A | | 7/1983 | Yamauchi | |
| 4,444,571 A | | 4/1984 | Matson | |
| 4,699,642 A | | 10/1987 | Perry et al. | |
| 5,061,302 A | | 10/1991 | Zuback | |
| 5,180,403 A | | 1/1993 | Kogure et al. | |
| 5,332,477 A | | 7/1994 | Iyer et al. | |
| 5,435,943 A | | 7/1995 | Adams et al. | |
| 5,532,389 A | | 7/1996 | Trent et al. | |
| 5,616,234 A | | 4/1997 | Rhees et al. | |
| 5,814,134 A | | 9/1998 | Edwards et al. | |
| 5,928,408 A | | 7/1999 | Higginbotham | |
| 6,009,635 A | | 1/2000 | Vidaurre et al. | |
| 6,046,267 A | | 4/2000 | Vidaurre et al. | |
| 6,051,736 A | | 4/2000 | Schraut et al. | |

FOREIGN PATENT DOCUMENTS

| | | |
|---|---|---|
| CA | 653008 | 11/1962 |

OTHER PUBLICATIONS

PCT International Search Report, dated Jul. 16, 2003, for PCT Appln. No. PCT/US03/05933.

\* cited by examiner

*Primary Examiner*—Duane Smith
*Assistant Examiner*—Douglas J. Theisen

(57) ABSTRACT

The invention is a stackable packing element for use in degassing liquid ophthalmic lens monomer, and to a modular degasser and process, including an in-line degassing process, employing same. The stackable packing element is comprised of a body module and a removable puck component.

21 Claims, 10 Drawing Sheets

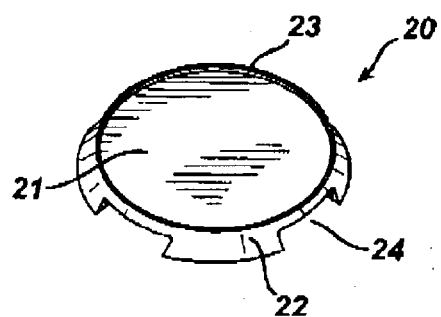
FIG. 2A
FIG. 2C
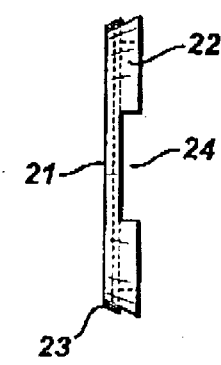
FIG. 2B
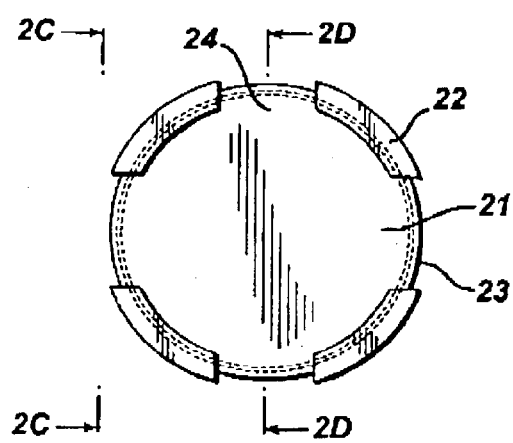
FIG. 2D
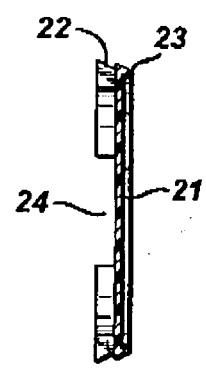

THIN FILM IN-LINE DEGASSER

CROSS REFERENCE TO RELATED APPLICATION

This application claims priority to provisional application, U.S. Ser. No. 60/360,910, filed Mar. 1, 2002, and having the same title and incorporated herein in its entirety by reference.

BACKGROUND OF THE INVENTION

1. Field of the Invention

The present invention is directed to the degassing of liquid monomer used in fabricating ophthalmic lenses, such as for example soft contact lenses. In particular, the invention concerns a packing element for a degasser. The packing element is modular, and adapted for stacking with other such modules. The invention provides increased flexibility for making modifications to the degas operation by allowing convenient addition, removal or replacement of such packing elements as may be required in response to any given situation. Moreover, the packing element of the invention can be more easily cleaned, which operation is further facilitated by the packing element being constituted of removable parts. The invention also permits in-line degassing of liquid monomer, which increases ophthalmic lens production line efficiencies and mitigates environmental concerns associated with batch degassing processes commonly used.

2. Description of the Prior Art

Ophthalmic lenses, such as for example, soft contact lenses, can be fabricated by a variety of techniques. The more industrially popular methods involve the use of suitable liquid monomers, such as hydroxyethyl methacrylate (HEMA), that are deposited into especially configured mold halves. The monomer can be cured by any number of techniques, e.g. ultraviolet radiation, to form the lens. The liquid monomer, however, invariably contains dissolved gases such as oxygen and nitrogen, which can detrimentally affect curing either by forming unwanted bubbles, which can manifest as voids or other flaws in the final lens, or by otherwise interfering with the curing mechanism itself. It has thus become a common practice to degas the liquid monomer prior to use.

Accordingly, different techniques have been explored for degassing the monomer. One practice is to employ a rotary evaporator unit that removes excess gas from the monomer by rotating same under subatmospheric pressure. The container holding the mixture is then flushed with and held under nitrogen atmosphere. Another technique is described in U.S. Pat. No. 5,435,943 wherein the monomer is pumped through a gas permeable tube surrounded by a subatmospheric chamber. Gases in the monomer permeate the tube in favor of the lower pressure on the outside of same, the degassed monomer then being deposited into the lens molds and cured.

While these methods have proven commercially useful, efforts to advance the degas operation are nonetheless of interest. For example, the rotary evaporator method provides an opportunity for nitrogen gas to re-dissolve into the monomer during back fill flushing. Degas using permeable tubing has its own drawbacks: it typically demands batch operation due to the particulars involved in pumping viscous liquid monomer through tubing; thus, monomer is stored in vessels until required, whereupon it is sent to a tubular degas station which is off line. In a production environment where automation and advances in automation are critical, the use of a batch operation causes numerous inefficiencies that can adversely affect yield and logistics. Related to this is the fact that the permeable tubing is at some point subject to breakage, due for example to the pressure difference on either side of the tube wall and wear of the material of construction, typically silicone tubing. Breakage usually results in a shut down and often requires the wholesale replacement of tubing bundles, even those that are still intact, the arduousness of which can further disrupt operations. Moreover, the permeable tubing typically can not be properly cleaned when the need arises given, for example, the difficulty of cleaning the lumen. A batch degas operation also creates disposal problems inasmuch as liquid monomers for ophthalmic lenses commonly have shelf lives, and if not used within same they must be discarded. Moreover, in a batch operation where liquid monomer is pumped from a storage vessel, there is always some residual monomer remaining in the vessel after use. The aggregate amount of this residue, in the context of an industrial production facility, must be disposed of once past its shelf life.

There is thus a continuing need in the art for a degas technology that has increased effectiveness in both operation and maintenance, which technology can be employed in-line, and with reduced disposal issues.

SUMMARY OF THE INVENTION

The present invention satisfies the foregoing desiderata. The invention is directed to a stackable packing element for a degasser employed to degas liquid monomer used to fabricate ophthalmic lenses. The stackable packing element comprises:

a body module having a bottom surface with at least one hole therethrough and an upwardly directed sidewall peripheral to said bottom surface and adapted for stacking with another body module, said bottom surface and said upwardly directed sidewall defining a chamber; and a puck having a top portion onto which said liquid monomer can flow, and a side member, said side member extending downwardly from said top portion to removably set said puck within said chamber, said side member defining at least one side opening through which said liquid monomer can flow from said top portion into said chamber and over said bottom surface and through said at least one hole.

The invention also relates to a degasser comprised of a plurality of said stackable packing elements, as well as a degassing process employing same. The degasser can comprise modular packing elements.

Beneficially, the invention enables thin film flow of liquid monomer over the surfaces defined which allows direct contact of the monomer with the vacuum environment or an inert environment, preferably in a vacuum environment, under which the degasser operates, thus providing more efficient degas than heretofore obtainable. The invention can also be implemented in-line with the production facility, thus eliminating the difficulties inherent to batch degas processing as set forth hereinabove. That is, using the invention, degassing can occur continuously with the degassed monomer being pumped directly to the deposition station on the production line. Furthermore, by being modular in nature, the invention enables quick reconfiguration of the degasser by simply stacking more packing elements to, or conversely by simply removing same from the stack. Additionally, the modularity of the packing elements and their surfaces are more easily cleaned than prior art devices; this is further facilitated by the packing element being constituted of removable parts.

In an alternative embodiment a plurality of stacking packing elements are assembled within a container, such as a column, but not attached to the container. Preferably, first and second packing elements alternate within the container. The packing elements have vertical supports between horizontally extended pieces. The flow of the liquid is from the uppermost packing element to the lowermost packing element. The plurality of stackable packing elements comprise at least two differently shaped modular packing elements that alternate in the stack. In the preferred embodiment, the flow of the liquid within the container is from the center of a first packing element towards the periphery of the first packing element then to the periphery of a second packing element located beneath the first packing element. The liquid then flows from the periphery to the center of the second packing element under vacuum or an inert environment within the container. In this embodiment the stackable packing elements do not themselves define the chambers within which a vacuum is established or through which an inert gas is pumped.

BRIEF DESCRIPTION OF THE DRAWINGS

FIGS. 2A, 2B, 2C and 2D are perspective, top and first and second side views, respectively, of an embodiment of a packing element of the invention, referred to as a puck. This puck embodiment being particularly useful with body portion illustrated in FIG. 1.

DETAILED DESCRIPTION OF THE INVENTION

The present invention has particular utility in degassing liquid monomer used to fabricate ophthalmic lenses. Examples of ophthalmic lenses in this regard include without limitation hard, soft, rigid gas permeable contact and intraocular lenses, and lenses for eyeglasses. The invention has especial utility for soft contact lenses commonly classified as hydrogel lenses; and for the liquid monomers from which these are generally prepared including but not limited to hydroxyethyl methacrylate (HEMA), vinyl pyrrolidone, glycerol methacrylate, methacrylic acid and acid esters. For purposes of this specification, the term "liquid monomer" includes monomers as aforesaid, mixtures of same, including mixtures of any or all of the above with other additives known in the art, such as for example, cross-linking and strengthening agents. Gases typically dissolved in said liquid monomer to which removal (degassing) is sought include oxygen and may include nitrogen, and other gases. While not constraining the present invention, soft lenses in this regard are typically prepared by free radical polymerization of monomer mix in a plastic mold having male and female halves of predetermined shape and characteristic. Polymerization is conventionally initiated by thermal means, or is photoinitiated using either UV or visible radiation.

Figure 1A:
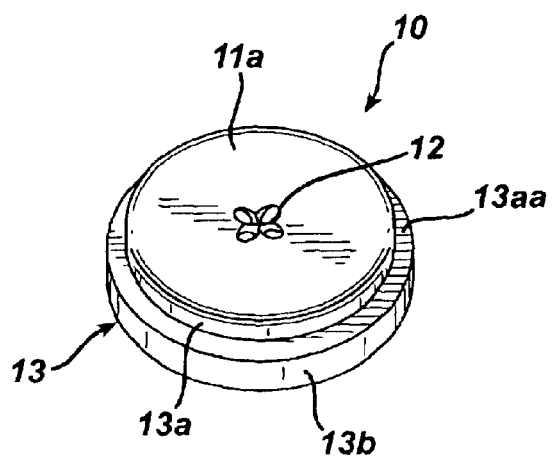
FIGS. 1A, 1B and 1C are perspective, bottom and side views, respectively, of an embodiment of a packing element, referred to as a body portion, of the invention.
Figure 1B:
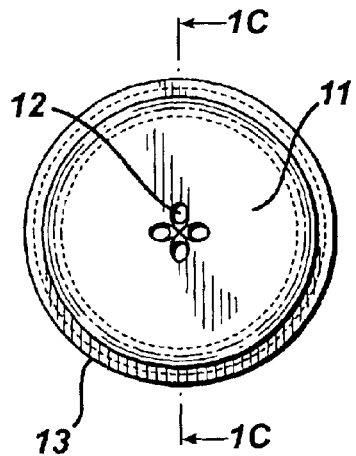

The present invention will now be described in the context of the preferred embodiments illustrated in FIGS. 1–6, it being understood that other embodiments and practices consistent with this description are contemplated as being within the scope the inventive practice delineated hereinunder. The present invention involves packing elements, preferably stackable packing elements for degassing as aforesaid. The packing elements can comprise multiple shapes, preferably repeating modular shapes. In this embodiment the stackable packing elements comprise a body module and a removable puck component. While these can be of any shape, e.g. circular, oval, square, rectangular, triangular and other polygonal shapes, it is preferred that they are generally circular. FIG. 1 shows a preferred embodiment of said body module. As depicted in FIG. 1A, body module 10 (shown in an upside down perspective in FIG. 1A) has a bottom surface 11 (the underside of which is denoted 11a in FIG. 1A) that has at least one hole 12 therethrough. Preferably, the bottom surface has a plurality of holes therethrough, more preferably these holes are centrally located on the bottom surface, e.g. located at, near or around the center of the bottom. In a more preferred practice, the plurality of holes 12 are located around the center of bottom 111 and equally spaced around same. In one embodiment, illustrated in FIG. 1A and in FIG. 3, the plurality of holes are located around the center of the bottom surface 11 and pass through same at an angle. Preferably the angle of each hole, which angle can be the same or different, converges toward the center line of bottom 11 as it passes therethrough, e.g. each of the four holes 12 depicted in FIGS. 1A and 1B pass through the bottom surface 11 at an angle of about 45° normal to the center line of bottom 11 (see also FIG. 3).

Figure 1C:
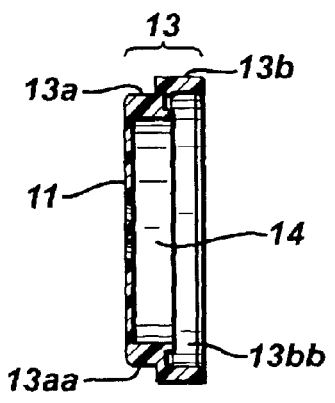
Figure 3:
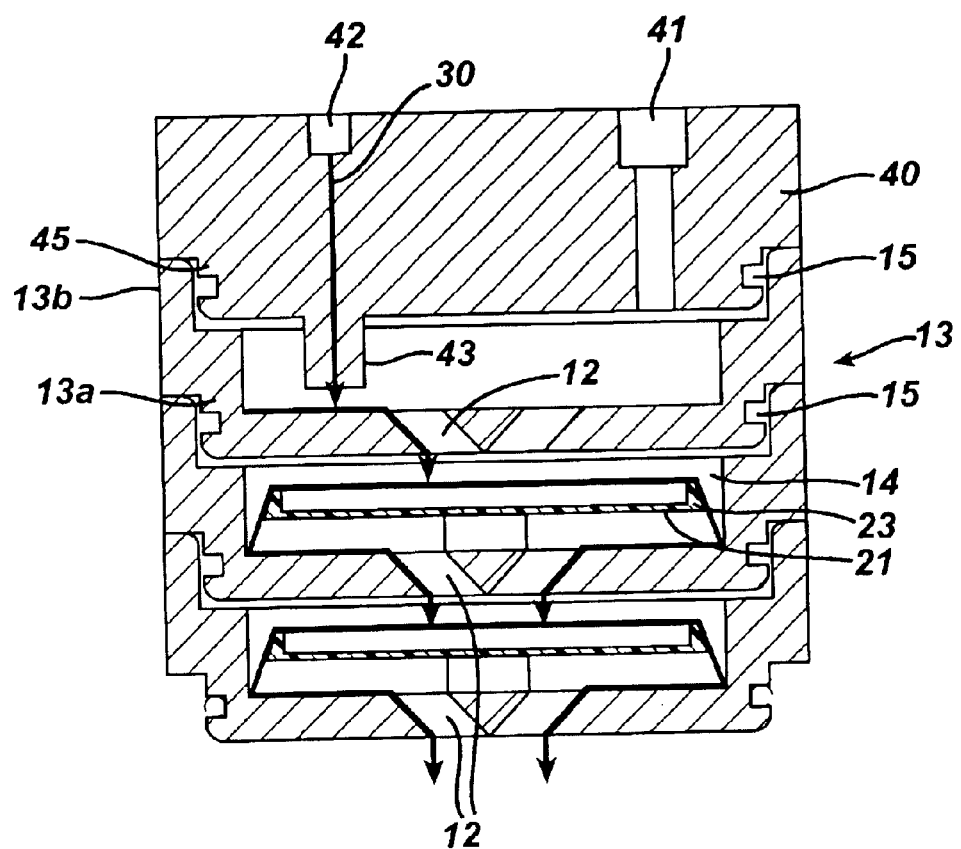
FIG. 3 depicts a plurality of packing elements, in particular packing elements constituted of the body portion and puck embodiments illustrated in FIGS. 1 and 2, stacked atop each other, with a top feed module delivering liquid monomer for degas, the figure further exemplifying the cascading flow of monomer through the packing.

Body module 10 further has an upwardly directed sidewall 13 peripheral to the bottom surface. The sidewall is adapted for stacking; that is, it is constructed such that the body module of one packing element can be stacked on top of, or below, another such packing element. Adaptations for stacking in the context of the invention include those known in the art, e.g. the use of appropriately sized indentations, protrusions, interlocking, overlapping configurations and the like. A preferred adaptation for stacking is shown in FIG. 1C and FIG. 3. In this embodiment, sidewall 13 has a lower portion, generally 13a, and an upper portion, generally 13b, which are juxtaposed so as to form a first notch 13aa that extends around the external periphery (here, the outer circumference) of lower portion 13a; and a second notch 13bb extends around the internal periphery (here, the inner circumference) of upper portion 13b. In one practice, the cylindrical portion of sidewall 13 that is formed by notch 13aa has a diameter smaller than that for the cylindrical portion of sidewall 13 formed by notch 13b, such that it can fit into (be overlapped at least in part by) same in a sleeve fashion, as shown for example in FIG. 3, thus enabling body modules 11 (hence the packing elements comprising same) to be stacked, one on top of the other. Preferably, the cylindrical portion of sidewall 13 formed by notch 13aa has means to secure a gasket or other sealing material, preferably a groove 15 (FIG. 3) into which a gasket ring 16 (FIG. 6), such as Viton® and like materials, can be placed.

The bottom surface 11 and upwardly directed sidewall 13 together define a chamber 14, within said body module. In the preferred practice shown in FIG. 1 and FIG. 3 this chamber is cylindrical in shape and closed at bottom surface 11 but for hole(s) 12. The sealing material forms a seal between the body modules that define a series of air-tight chambers in the degasser when the vacuum or other lower pressure environment (lower pressure than atmospheric pressure) is established. Alternatively mechanical means, such as a clamp, an adjustable band, weights can be used to keep the packing elements in a sealed arrangement, particularly when a lower pressure, e.g. vacuum, environment is not created within the degasser. Other mechanical means include the provision of mating threaded or grooved parts of the packing elements that can be screwed or snapped together to form a seal between the body modules or other packing elements. For example, threads (not shown) can be added in the lower portion 13a and upper portions 13b of the side walls of the body modules; the threads can be screwed together to form an air-tight chamber in the degasser. Other parts of the degasser, e.g. top feed module and reservoir module would be provided with or held in an air-tight relationship with the packing elements by the same or different, preferably the same, mechanical means. This embodiment is especially useful when an inert environment is created in the degasser. An inert environment would include nitrogen, argon or the like.

FIG. 2 shows a preferred embodiment of a puck component which together with the body module aforesaid comprise the inventive packing element. In the practice depicted in FIG. 2A, puck 20 has a cap or cap-like shape and has a top portion 21 and a side member 22 which extends downwardly from the top portion. It will be appreciated that in a preferred practice the geometry of the body module and that for the puck will be similar. For example, in FIG. 1 the body module is generally circular, hence in a preferred practice the puck will also be generally circular, as indicated in FIG. 2. Dimensionally, the puck is preferably of a size to fit within chamber 14, preferably, to not extend into the region defined by upper sidewall portion 13a, as delimited for example by notch 13aa, in which region stacking occurs as described above. Top portion 21 preferably has a substantially flat upper surface. Side member 22 is designed to permit the puck to be removably set within chamber 14. For example, and without limitation, the side member can be configured to freely stand puck 20 within chamber 14. Preferably, the side member is configured to stand top portion 21 away from the bottom surface 11 and preferably away from hole(s) 12. Side member 22 further defines at least one side opening 24. Preferably, a plurality of side openings are so defined; more preferably, they are equally spaced along the periphery (here, the circumference) of puck 20. Suitable side members include a skirt with one or more side openings, or a plurality of projections, e.g. legs, struts and the like, the areas between which define the side openings. In the practice shown in FIG. 2 side member 22 appears as a plurality of projections defining a plurality of side openings 24. Preferably, as illustrated in FIG. 2, each of the side members among themselves have approximately the same circumferential length, as do the side openings. More preferably, each side member and each side opening as between each other have the approximately the same circumferential length. In one practice, shown e.g. in FIG. 2B, there are four side members 22 each of the same circumferential length (that is, as shown, each takes up about ⅛th of the circumference) and each equally spaced apart along the circumference so as to define four side openings each having approximately that same length. In one embodiment, as exemplified in FIGS. 2C and 2D, side members 22 extend downward at an outward slant from the top portion 21.

Functionally, as illustrated in FIG. 3, liquid monomer 30 is fed into the packing element, either from a top feed module 40 or from a packing element stacked above, flows onto the top portion 21 of the puck, down same and into chamber 14, over bottom surface 11 and through hole(s) 12 (the cascading flow streams of said liquid monomer as it traverses the packing elements is shown by the bold flow lines in FIG. 3). Monomer exiting said hole(s) 12 can serve as feed to the packing element thereunder or can feed into a reservoir module where it is collected, an embodiment of which is shown in FIG. 5 wherefrom it then is pumped, preferably in a pulsed or continuous fashion, to the production line using, e.g. one or more peristaltic pumps. Rheologically, in flowing through the packing element of the invention, a thin film of monomer is created, e.g. on the top surface of the puck and the bottom surface of the chamber. This thin film of monomer containing dissolved gases is in direct contact with the vacuum or inert environment under which the packing element operates for degassing purposes. The dissolved gases evaporate into the vacuum or inert environment and are removed from the packing element in the vacuum or inert stream. In a preferred practice, the top portion 21 of puck 20 has a lip 23 therearound, which lip enables the liquid monomer to pool (to an extent given it is under flow) on the top surface. This pooling permits extended contact with the vacuum environment and thus facilitates degassing. In a preferred embodiment of this practice, as seen in FIGS. 2C, 2D and 3, the external edge of lip 23 is outwardly slanted to assist fluid flow down into the chamber.

Figure 4A:
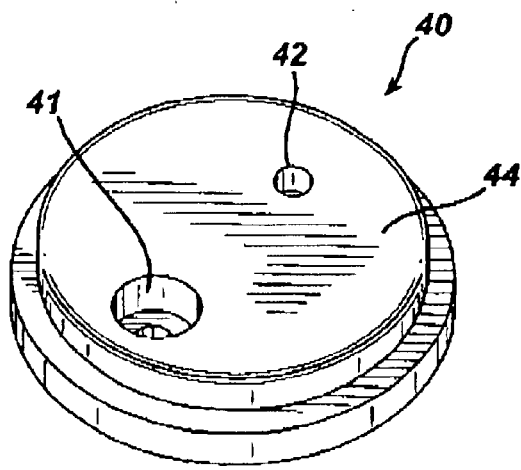
FIGS. 4A, 4B and 4C are perspective, bottom and side views, respectively, of an embodiment of a top feed module for the invention, this embodiment being particularly useful with the packing elements of FIG. 3.
Figure 4B:
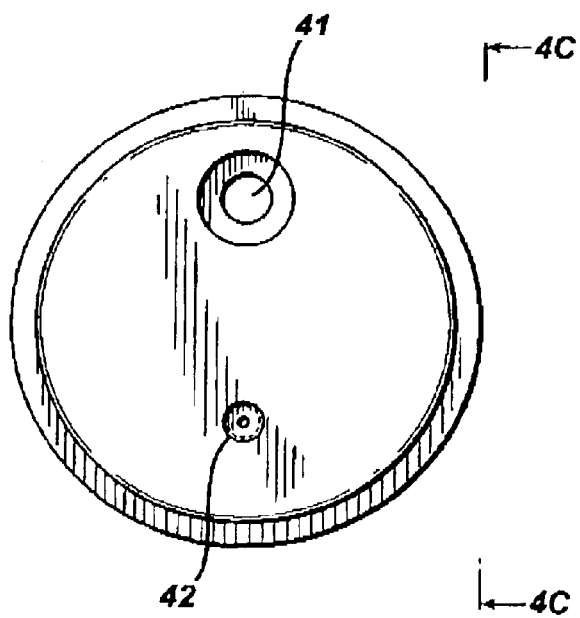
Figure 4C:
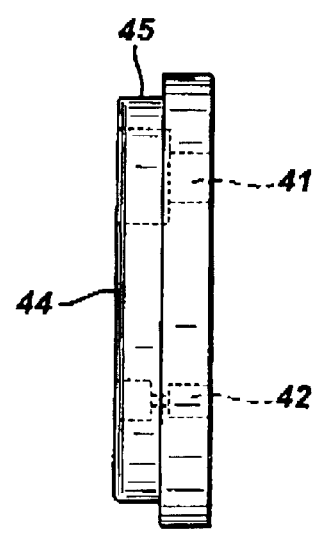
Figure 5A:
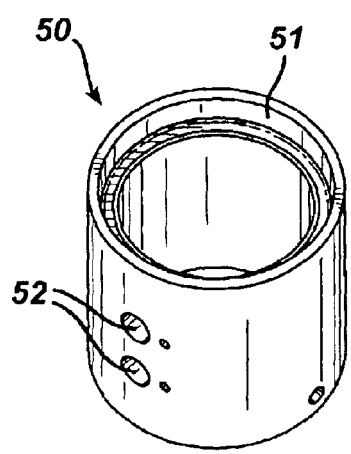
FIGS. 5A, 5B, 5C, 5D and 5E are perspective, bottom and first, second and third side views, respectively, of an embodiment of a reservoir module for the invention, this embodiment being particularly useful with the packing elements of FIG. 3.
Figure 5B:
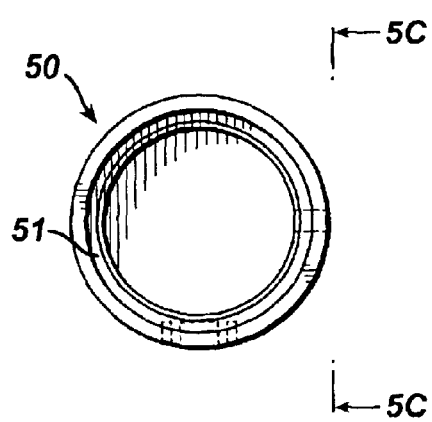
Figure 5C:
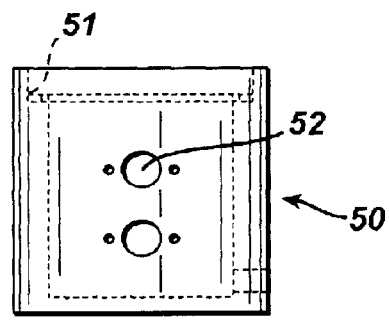
Figure 5D:
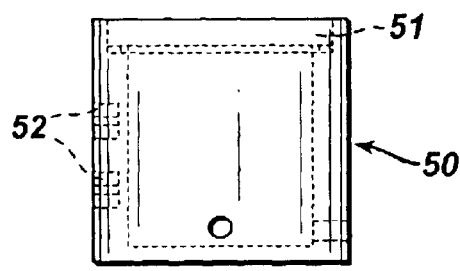
Figure 5E:
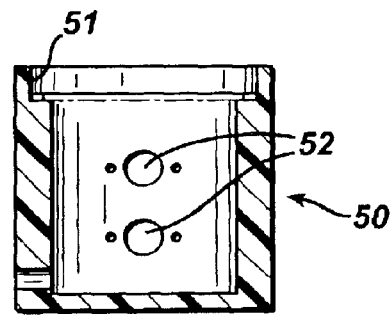

FIG. 4 shows a preferred top feed module 40 for use with the packing elements in forming a degasser as contemplated by the invention. FIG. 4A shows a perspective view (of the underside 44 of the feed module) of said feed module which has one or more liquid monomer feed inlets 42 and one or more outlets 41 from which vacuum is pulled. In a preferred practice, the feed inlet has a downcomer 43 (FIGS. 3 and 6) to assist in directing flow to the top portion of the puck thereunder. In another preferred embodiment, top feed module 40 has a sidewall that is adapted to stack with the packing elements, e.g. top module 40 has a notch 45 (FIG. 4C) extending around the periphery of its sidewall which, as shown in FIG. 3, fits into the overlapping cylinder defined by upper sidewall portion 13a of the packing element. In a preferred practice, the packing element immediately beneath the top feed module does not have a puck component; that is, only the body portion is utilized at this point, as shown in FIG. 3. Top feed module 40 is also advantageously designed with means to secure a gasket, such as groove 15 (FIG. 3).

Figure 6:
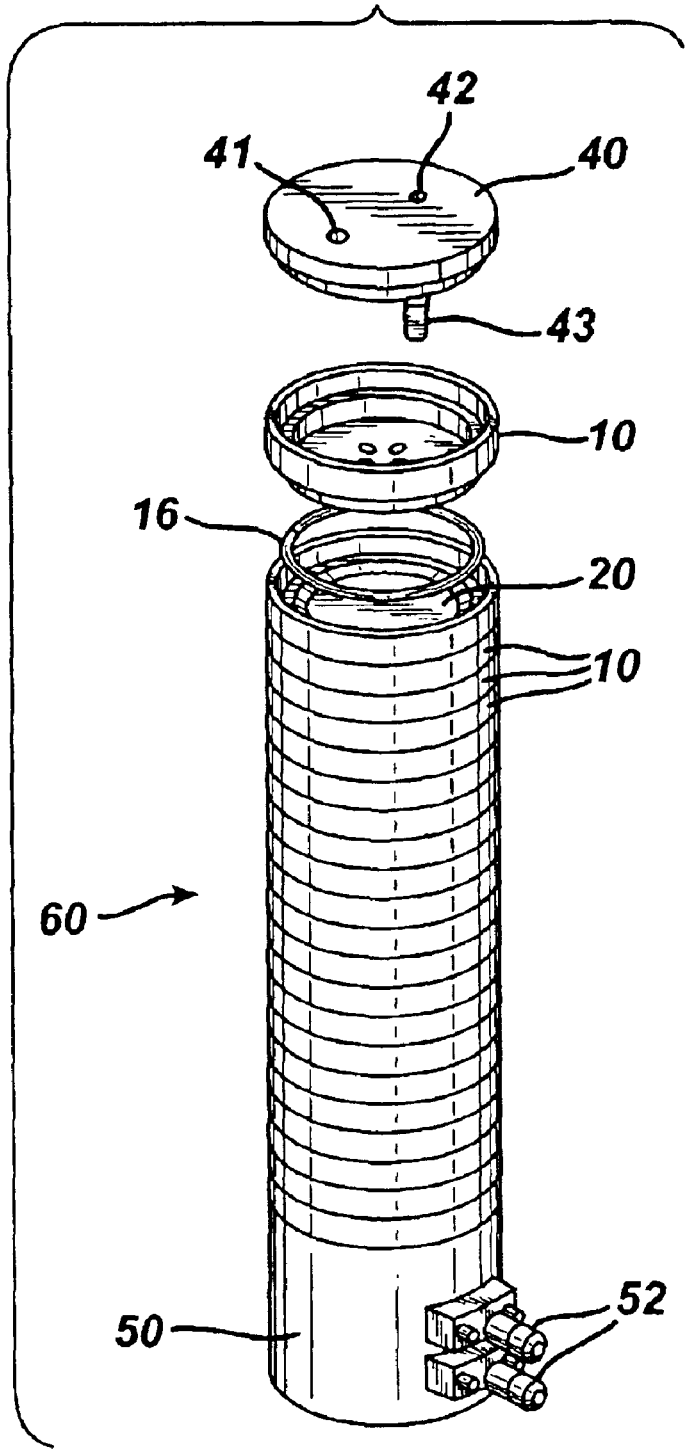
FIG. 6 depicts an embodiment of a modular degasser of the invention, said embodiment constituted of a plurality of packing elements as stacked in FIG. 3 with the embodiments of the top feed module and reservoir module of FIGS. 4 and 5 respectively.

FIG. 5 shows a preferred reservoir module 50 into which degassed liquid monomer flows and is collected and pumped for dosing into the lens mold halves to form the ophthalmic lens. Reservoir 50 is preferably the last module in the degasser, as shown in FIG. 6. Reservoir module 50 is preferably provided with one or more degassed liquid monomer outlets 52 which are connected to one or more pumps (not shown), preferably peristaltic pumps as commercially available. The use of one or more outlets 52 and one or more pumps especially facilitates pumping operations when the degasser and reservoir 50 are operating under vacuum and/or the liquid monomer is viscous. In another preferred embodiment, reservoir module 50 has a sidewall that is stackably adapted to the packing elements, e.g. reservoir module 50 has a notch 51 (FIGS. 5C, 5D and 5E, which are each side views of the reservoir rotated 90° each time, respectively) extending around the periphery of its sidewall which, as indicated in FIG. 6, fits around and overlaps the cylinder defined by lower sidewall portion 13b of the last packing element.

FIG. 6 shows an embodiment of the modular degasser of the invention constituted of the preferred packing elements and top feed and reservoir modules of FIGS. 1–5. The modular degasser 60 is preferably operated under vacuum (i.e. subatmospheric conditions) and is constituted of a plurality of packing elements subject of the invention, as comprised of body modules 10 and pucks 20. Thus the height (the number of packing elements) of degasser 60 can be increased or decreased by simple addition or removal of packing elements. As appreciated by those of skill in the art, the height of degasser 60 depends among other things on the level of dissolved gases targeted to remain in the liquid monomer after degassing, and also on the viscosity of the liquid monomer itself. Hence it will be understood that the lower the final level of dissolved gas, e.g. oxygen and the like, desired and/or the higher the viscosity of the liquid monomer, the greater the number of packing elements the degasser needs. The level of dissolved gases remaining in the liquid monomer after degassing can be monitored using methods known in the art, which monitoring in turn can indicate when an increase or decrease in the number of packing elements is required. Operationally, vacuum is pulled on degasser 60 through outlet(s) 41 using means known in the art; typical vacuum ranges in terms of absolute pressure are about 20 millibar to about 100 millibar, it being understood that higher and lower pressures are contemplated. In a preferred practice, the liquid monomer is essentially free of dissolved gases after degassing with the present invention.

Figure 7A:
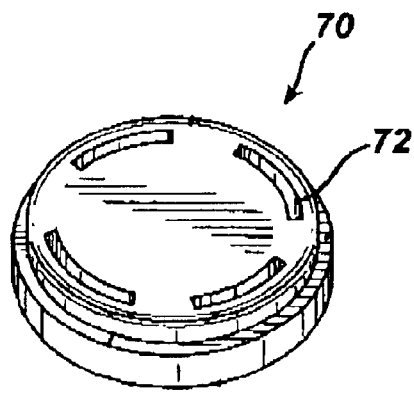
FIGS. 7A, 7B and 7C are perspective, bottom and side views, respectively, of an alternative embodiment of a body portion for the packing element of the invention.
Figure 7B:
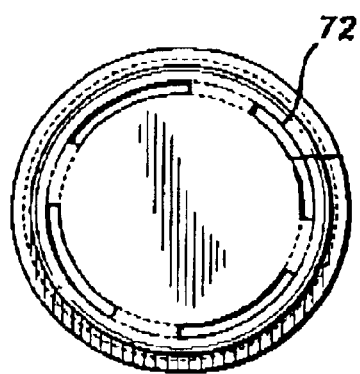
Figure 7C:

In an alternative embodiment, the packing elements may comprise alternating body modules 10 as shown in FIGS. 1A, 1B, and 1C, and body modules 70 shown in FIGS. 7A, 7B and 7C, with or without additional pucks or baffles added between the body modules. As shown body module 70 is similar to body module 10 except that the holes 72 shown in body module 70 are located around the circumference of the bottom of the body module. In an embodiment consisting of alternating body modules 10 and 70, the holes 12 and 72 direct the monomer or any other reactive mixture across the surface of the body modules and either down through the center of the body module as shown in FIG. 1 or through the holes located around the circumference of the body module as shown in FIG. 7. Alternatively, the holes may be located on opposite sides (180 degrees) across the body modules and the flow may be across the body modules, and down to the next body module. The body modules may have alternative shapes to those shown herein.

Preferred materials of construction for the packing element of the invention, including the body module and puck, and further including the top feed module and reservoir, include without limitation polymeric material, such as for example only, engineering grade plastics Serviceable polymeric materials include, without limitation to the scope of possible materials, polyacetyls (e.g. Delrin®, which is most preferred), polystyrenes, polypropylenes, polyethylenes, polyetheretherketones (PEEK), polyamides (e.g. Nylon®), polyimides, polyamideimides (PAI), polyfluoroethylenes (e.g. Teflon®), polyetherimides, polyesters, polycarbonates, polyethers, polyetherimides, polysulfide polymers, polysulfones, and blends and alloys of the foregoing.

Figure 8:
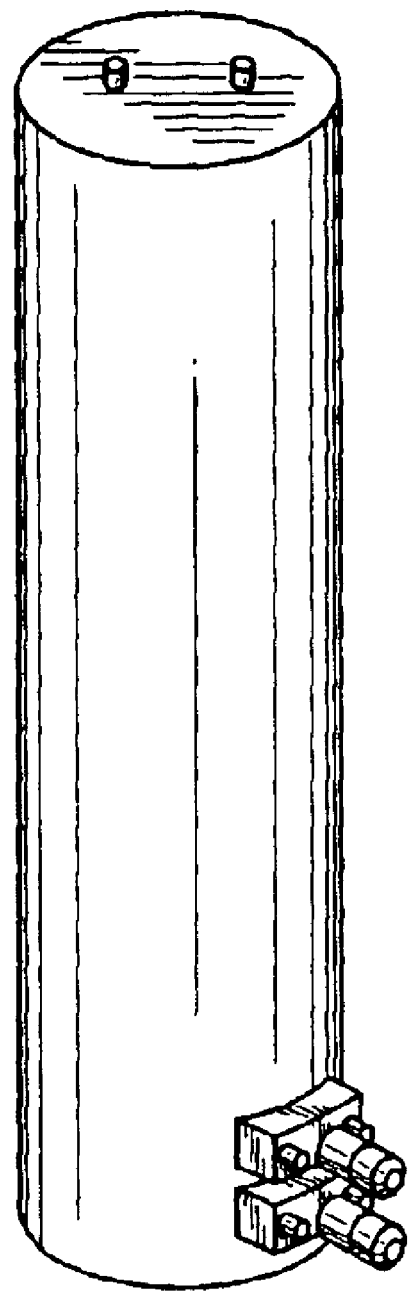
FIG. 8 is a second embodiment of a degasser.

Alternatively, the packing elements shown in FIGS. 9 and 10 can be used in a column shown in FIG. 8. The packing elements are designed as in the earlier embodiments except that they do not define the air-tight chamber within which the vacuum or inert environment is established. The packing elements are instead assembled within a container, e.g. the column shown in FIG. 8, and the vacuum or inert environment is established within the container. The packing elements define surfaces that direct the liquid towards the center of the first packing elements and out to the periphery of the second packing elements, or in the alternative flow patterns described above. The packing elements are not attached to the degasser container and if desired can be shaped so that no liquid under normal operating conditions will touch the inside of the column, except if desired for a reservoir at the bottom accumulated after the liquid flows through the stack of packing elements.

Figure 9A:
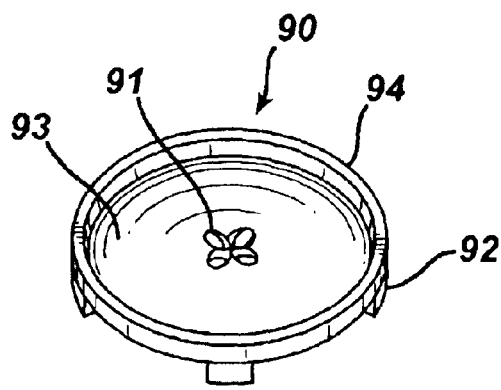
FIGS. 9A, 9B, and 9C are perspective, bottom and side views, respectively, of an alternative embodiment of a packing element of the invention.
Figure 9B:
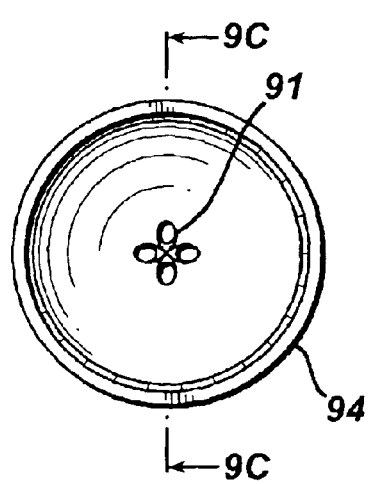
Figure 9C:
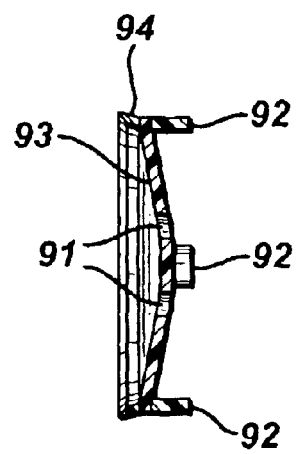
Figure 10A:
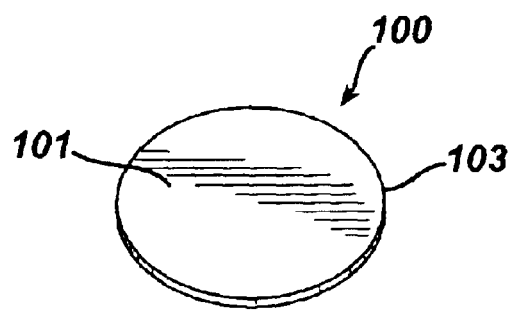
FIGS. 10A, 10B, and 10C are perspective, bottom and side views, respectively, of an alternative embodiment of a packing element of the invention to be used with the packing element shown in FIGS. 9A, 9B and 9C in the degasser shown in FIG. 8.
Figure 10B:
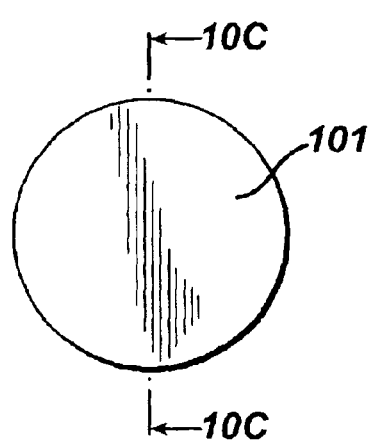
Figure 10C:
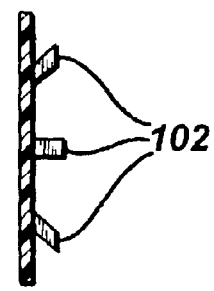

The packing element shown in FIGS. 9A, 9B and 9C can be assembled in an alternating arrangement with the packing element shown in FIGS. 10A, 10B, and 10C. The packing element 90 is shaped to direct the liquid to the center of the packing element where holes 91 direct the flow of liquid to the packing element below. The packing element 90 has legs or other supports 92 which support the flow surface 93 above the packing element located beneath packing element 90. Notches, dimples, bumps or the like can be provided on surface 101 to receive the supports 92 if desired to provide stability to the stacked packing elements. As shown, packing element 90 preferably has a lip 94 that directs the liquid away from the walls of the container and towards the center of the surface 93. Surface 93 is preferably slanted towards the holes 91; however, it is preferred that the surface 93 is substantially horizontal. In this embodiment, preferably the packing element 100 shown in FIGS. 10A, 10B, and 10C is located beneath the packing element 90. (Packing element 90 is supported and stacked upon packing element 100.) Packing element 100 preferably comprises a flat or substantially flat surface 01 supported by legs or other supports 102 that preferably keeps the surface 101 spaced from the surface of the packing element located beneath packing element 100. The liquid from packing element 90 hits the center of surface 101 and then flows out towards the periphery 103 of the surface 101 of packing element 100. Then the liquid preferably flows to another packing element 90 located beneath packing element 100. Notches, dimples, bumps or the like can be provided on surface 101 to receive the supports 92, if desired to provide stability to the stacked packing elements.

In a preferred embodiment to keep the inside walls of the container clean, preferably the liquid only contacts packing elements 90 and 100, and not any inside surfaces of the container. In this way this embodiment provides the simple clean-up that is provided by the earlier embodiments. The stack of modular packing elements preferably consisting of alternating packing elements 90 and 100 can be removed from the column and washed separately in a dish washer or the like and then reassembled inside the column without having to mechanically remove or attach any of the packing elements to the column or other container. The packing elements are only stacked one on top of the other which makes assembly and disassembly easy for cleaning. If the column must be cleaned it can be easily cleaned with a pipe cleaner. Missing details for this embodiment can be the same as or similar to details described for the earlier embodiments.

The column can be made of any of the materials used in the prior art to make degas columns, such as, glass, and engineering grade plastics. Serviceable polymeric materials include, without limitation to the scope of possible materials, polyacetyls (e.g. Delrin®, which is most preferred), polystyrenes, polypropylenes, polyethylenes, polyetheretherketones (PEEK), polyamides (e.g. Nylon®), polyimides, polyamideimides (PAI), polyfluoroethylenes (e.g. Teflon ®), polyetherimides, polyesters, polycarbonates, polyethers, polyetherimides, polysulfide polymers, polysulfones, and blends and alloys of the foregoing. Depending upon the liquid to be degassed, and or the amount of contact between the metal and the liquid to be degassed, metals might be useful, although presently not preferred.

What is claimed is:

1. A stackable packing element for a degasser for liquid monomer used to make ophthalmic lenses which comprises:
    a body module having a bottom surface with at least one hole therethrough and an upwardly directed sidewall peripheral to said bottom surface and adapted for stacking with another body module, said bottom surface and said upwardly directed sidewall defining a chamber; and
    a puck having a top portion onto which said liquid monomer can flow, and a side member, said side member extending downwardly from said top portion to removably set said puck within said chamber, said side member defining at least one side opening through which said liquid monomer can flow from said top portion into said chamber and over said bottom surface and through said at least one hole.

2. The stackable packing element of claim 1 wherein said bottom surface has a plurality of holes therethrough, said holes being centrally located on the bottom surface.

3. The stackable packing element of claim 2 wherein said plurality of holes each pass through said bottom surface at an inclined angle.

4. The stackable packing element of claim 1 wherein said top portion of said puck has a substantially flat upper surface onto which said liquid monomer can flow, said top portion having a lip therearound.

5. The stackable packing element of claim 4 wherein said side member comprises a plurality of spaced projections that extend downward at an outward slant from said top portion.

6. The stackable packing element of claim 1 wherein said sidewall is adapted for stacking by having a first notch extending around the periphery of a lower portion of said sidewall and a second notch extending around the periphery of an upper portion of said sidewall, said first notch configured to mate with the second notch on another body module.

7. The stackable packing element of claim 6 wherein said first notch extends around the external periphery of said lower portion of said sidewall, and said second notch extends around the internal periphery of said upper portion of said sidewall, said first notch configured to fit within the second notch said another body module.

8. A modular degasser for degassing liquid monomer used to make an ophthalmic lens, said modular degasser having a plurality of packing elements stacked together, each of said packing elements comprising:
    a body module having a bottom surface with at least one hole therethrough and an upwardly directed sidewall peripheral to said bottom surface and adapted for stacking with another body module, said bottom surface and said upwardly directed sidewall defining a chamber; and
    a puck having a top portion onto which said liquid monomer can flow, and a side member, said side member extending downwardly from said top portion to removably set said puck within said chamber, said side member defining at least one side opening through which said liquid monomer can flow from said top portion into said chamber and over said bottom surface and through said at least one hole.

9. The modular degasser of claim 8 wherein said at least one hole is situated such that liquid monomer flowing through same forms the liquid monomer flow onto the top portion of the puck of the packing element stacked thereunder.

10. The modular degasser of claim 9 further comprising a top feed module having inlet means for feeding liquid monomer to said degasser, and outlet means situated such that said liquid monomer from said outlet means forms the liquid monomer flow onto the top portion of the puck of the packing element located under said top feed module.

11. The modular degasser of claim 10 wherein said outlet means further comprises a downcomer.

12. A process for degassing liquid monomer used for fabricating ophthalmic lenses, said process comprising:
    providing a feed of liquid monomer to a modular degasser operating under vacuum, said degasser having a plurality of pecking elements stacked together, each of said packing elements comprising: a body module having a bottom surface with at least one hole therethrough and at upwardly directed sidewall peripheral to said bottom surface and adapted for stacking with another body module, said bottom surface and said upwardly directed sidewall defining a chamber; and
    a puck having a top portion onto which said liquid monomer flows forming a thin film, and a side member, said side member extending downwardly from said top portion to removably set said puck within said chamber, said side member defining at least one side opening through which said liquid monomer flows in a thin film from said top portion into said chamber and over said bottom surface and through said at least one hole, said liquid monomer passing through said at least one hole providing the liquid monomer flow onto the top portion of the packing element thereunder, said liquid monomer being degassed as it flows through said packing elements; and
    collecting degassed liquid monomer feed from said plurality of packing elements.

13. The process of claim 12 wherein the providing of said liquid monomer feed to the degasser is via a top feed module.

14. The process of claim 13 wherein said collecting occurs in a bottom reservoir module under the last packing element of said plurality of packing elements.

15. The process of claim 14 further comprising the step of pumping the degassed liquid monomer from said bottom reservoir to a dosing station wherein said degassed liquid monomer feed is deposited into a lens mold half.

16. The process of claim 15 wherein said providing of liquid monomer feed, said collecting of degassed liquid monomer and maid pumping is continuous.

17. The process of claim 16 wherein the process is in-line to an ophthalmic lens production line.

18. A degasser useful for degassing a liquid under a vacuum comprising:

a first packing element and separate second packing element;

said first packing element is stacked on top of said second packing element and directs the flow of said liquid from said first packing element to said second packing element;

said first packing element comprises a surface;

said second packing element comprises a surface; and wherein said at least one of said first and second packing elements further comprise supports to maintain the surfaces of the first and second packing elements separated.

19. The degasser of claim 18, further comprising a container into which said first packing element and said second packing element are stacked on top of each other and placed therein.

20. The degasser of claim 18, wherein said at least one of said first packing element or second second packing element comprises sidewalls defining a chamber.

21. The degasser of claim 18, wherein said surfaces of said first packing element and second packing element are substantially horizontal.

* * * * *